US012687351B2

(12) United States Patent
Klingenburg

(10) Patent No.: US 12,687,351 B2
(45) Date of Patent: Jul. 21, 2026

(54) PLATE FOR A PLATE-TYPE HEAT EXCHANGER

(71) Applicant: Kai Klingenburg, Essen (DE)

(72) Inventor: Kai Klingenburg, Essen (DE)

(73) Assignee: KLINGENBURG GMBH, Gladbeck (DE)

( * ) Notice: Subject to any disclaimer, the term of this patent is extended or adjusted under 35 U.S.C. 154(b) by 215 days.

(21) Appl. No.: 18/433,685

(22) Filed: Feb. 6, 2024

(65) Prior Publication Data

US 2024/0247887 A1 Jul. 25, 2024

Related U.S. Application Data

(60) Division of application No. 17/567,950, filed on Jan. 4, 2022, now abandoned, and a continuation-in-part of application No. 15/527,927, filed as application No. PCT/EP2015/001863 on Sep. 19, 2015.

(30) Foreign Application Priority Data

Nov. 24, 2014 (DE) .......................... 102014017362.3

(51) Int. Cl.
| | |
|---|---|
| *F28F 21/06* | (2006.01) |
| *B32B 5/02* | (2006.01) |
| *B32B 7/12* | (2006.01) |
| *B32B 27/12* | (2006.01) |
| *B32B 27/40* | (2006.01) |
| *F28D 21/00* | (2006.01) |

(52) U.S. Cl.
CPC ............ *F28F 21/065* (2013.01); *B32B 5/022* (2013.01); *B32B 7/12* (2013.01); *B32B 27/12* (2013.01); *B32B 27/40* (2013.01); *F28D*

*21/0015* (2013.01); *B32B 2250/03* (2013.01); *B32B 2250/40* (2013.01); *B32B 2255/10* (2013.01); *B32B 2255/20* (2013.01); *B32B 2262/0276* (2013.01); *B32B 2307/724* (2013.01)

(58) Field of Classification Search
CPC B32B 5/022; B32B 7/12; B32B 27/12; B32B 27/40; B32B 2250/03; B32B 2250/40; B32B 2255/02; B32B 2255/10; B32B 2255/20; B32B 2262/0276; B32B 2307/302; B32B 2307/724; B32B 2307/726; F28D 21/0015; F28F 21/065
See application file for complete search history.

(56) References Cited

U.S. PATENT DOCUMENTS

| | | | | |
|---|---|---|---|---|
| 6,536,514 B1 * | 3/2003 | Sugiyama | ............... | F24F 3/147 |
| | | | | 165/905 |
| 8,726,978 B2 * | 5/2014 | Takada | .................. | F28D 9/0062 |
| | | | | 165/166 |

(Continued)

*Primary Examiner* — Eric S Ruppert
*Assistant Examiner* — Hans R Weiland
(74) *Attorney, Agent, or Firm* — Andrew Wilford

(57) ABSTRACT

A plate for a heat exchanger is made by first providing a first rigid support layer of a flat generally planar shape and consisting of a broken-through and plastically deformable material. Then a flat generally planar membrane layer capable of transferring enthalpy between two fluid streams is laminated to the first layer by a surface-connection layer. These three laminated-together layers are then deformed into a three-dimensional shape.

10 Claims, 2 Drawing Sheets

(56)                References Cited

U.S. PATENT DOCUMENTS

| | | | |
|---|---|---|---|
| 2002/0185266 A1* | 12/2002 | Dobbs | F24F 3/147 |
| | | | 165/166 |
| 2003/0091872 A1* | 5/2003 | Yan | C23C 18/1212 |
| | | | 428/701 |
| 2006/0090650 A1* | 5/2006 | Yamakawa | F28D 21/0015 |
| | | | 96/11 |
| 2012/0073791 A1* | 3/2012 | Dubois | B01D 67/0002 |
| | | | 96/9 |
| 2013/0248160 A1* | 9/2013 | Eplee | F28D 9/0025 |
| | | | 165/165 |

* cited by examiner

3 - Nonwoven

2 - Plastic membrane

4 - Nonwoven

PLATE FOR A PLATE-TYPE HEAT EXCHANGER

CROSS REFERENCE TO RELATED APPLICATIONS

This application is a division of U.S. patent application Ser. No. 17/567,950 filed 4 Jan. 2022 as a continuation-in-part of then copending U.S. patent application Ser. No. 15/527,927 filed 18 May 2017, which in turn is the US-national phase of PCT/EP2015/007863 filed 19 Sep. 2014 with a claim to the priority of DE 10 2014 017 362.3 filed 24 Nov. 2014 and published as WO 2016/082902.

FIELD OF THE INVENTION

The invention relates to a plate for a plate-type heat exchanger.

BACKGROUND OF THE INVENTION

Plates of this type are usual in most diverse forms and made of numerous different materials.

OBJECT OF THE INVENTION

Starting from this, it is the object of the invention to provide a plate for a plate-type heat exchanger that on the one hand can be manufactured at low expense, has a comparatively low weight and nevertheless has exceptional enthalpy exchange properties in addition to the usual heat-exchange properties. In addition to sensitive heat or temperature, moisture or water vapor should also be transferred or exchanged between different fluid streams.

SUMMARY OF THE INVENTION

This object is solved according to the invention by a plate for a plate-type heat exchanger in which the plate is an at least two-layer laminate comprising a membrane layer by means of which enthalpy can be transferred between two fluid streams separated by the plate and at least one support layer that consists of a broken-through and deformable material and by means of which the plate can be provided with a predetermined mechanical strength and a nonplanar, three-dimensional and self-supporting structure.

Such a plate can be manufactured at low expense with the desired properties.

The membrane layer of the plate according to the invention can advantageously be configured as a plastic membrane layer.

The at least one support layer of the plate according to the invention can be configured as a woven fabric or nonwoven layer at comparatively low expense, wherein the necessarily broken-through structure of the support layer is advantageously obtained by the selection of the said materials.

In order to provide the plate according to the invention with the predetermined mechanical strength and the desired three-dimensional structure with technically constructive low expenditure, it is advantageous if the at least one support layer of the plate is formed from a thermally deformable material.

In an advantageous embodiment of the plate according to the invention, this is configured as a three-layer laminate, having a further support layer that is disposed on the side of the membrane layer facing away from the first support layer and by means of which the plate can be provided with a predetermined mechanical strength and a three-dimensional and self-supporting structure.

A flat, point-by-point, strip or grid-shaped connection of each support layer to the membrane layer can be achieved by material properties of each support layer and/or membrane layer. In this case, no additional connecting means such as adhesives or the like are then required.

Alternatively however it is also possible to achieve the flat, point-by-point, strip or grid-shaped and adhesive connection of each support layer to the membrane layer by a binder, preferably by a hot melt adhesive.

The nonwoven layers can advantageously be formed from a polyester nonwoven.

This polyester nonwoven should expediently have a weight between 20 and 80, preferably of about 50 g/m².

In order to ensure the permeability of the polyester nonwoven for liquid and therefore the removal of liquid to the plastic membrane layer, it is advantageous if the polyester nonwoven is hygroscopically variable.

This can expediently be achieved whereby the polyester nonwoven has a coating made of a zeolite and a binder.

The enthalpy transfer properties of the plastic membrane layer can be achieved with comparatively low expenditure if the plastic membrane layer is formed from a polymer or polyurethane material.

Expediently the previously described plates can be interlocked and welded or adhesively bonded at their edges so that they can be joined together to form a plate-type heat exchanger with an extremely low technical constructive expenditure.

In a method according to the invention for manufacturing a plate for a plate-type heat exchanger, an at least two-layer laminate comprising a membrane layer, preferably a plastic membrane layer and at least one support layer, preferably a nonwoven layer in each case is prepared in a flat form on both sides of the plastic membrane layer, after which this flat laminate is provided by a single deformation step with a rigid three-dimensional, load-bearing and self-supporting structure. In this deformation step it is possible to use those tools that are also used in plates made of materials known from the prior art. Hence, no expensive modification etc. of existing production installations is required.

Expediently in the deformation step an adhesive connection is simultaneously made between each support layer and the membrane layer. The expenditure for the manufacture of the plate according to the invention can thus be comparatively low.

The deformation accompanying the production of the adhesive connection is accomplished by pressing at a maximum of <160° C. This ensures that the enthalpy transfer characteristics of the membrane layer are not adversely influenced.

Varying hygroscopy of the support or nonwoven layers can be achieved with a comparatively low expenditure by providing the support or nonwoven layers with a coating made of a zeolite and a binder by a dipping or spraying process.

As a result of varying hygroscopy of the support or nonwoven layers, if a hydrophilic adjustment of the support or nonwoven layers is provided, it can be achieved that water deposited in the support or nonwoven layers is distributed uniformly over the surface of the support or nonwoven layers with the result that the permeability of the plate overall is maintained.

BRIEF DESCRIPTION OF THE DRAWING

The invention is explained in detail hereinafter by an embodiment with reference to the drawing in which.

SPECIFIC DESCRIPTION OF THE INVENTION

Figure 1:
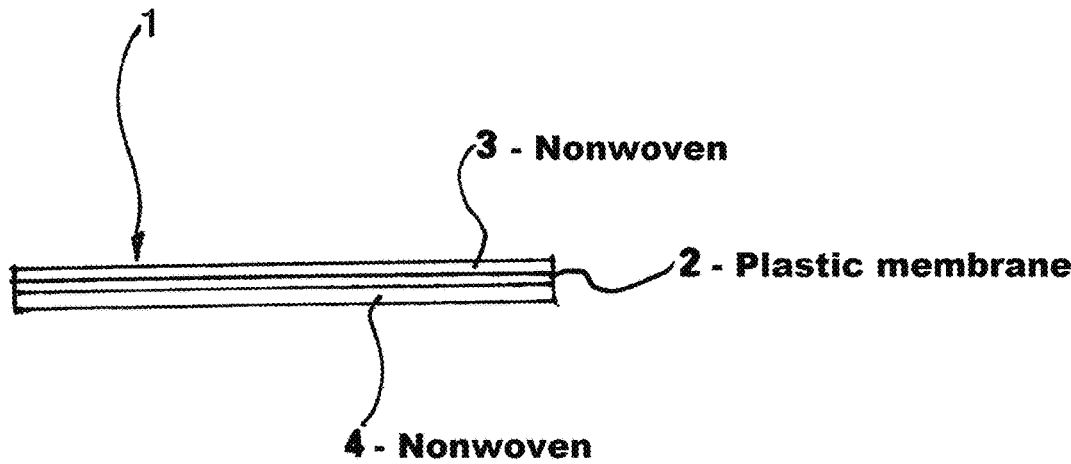
FIG. 1 is a large-scale cross-sectional view of the laminate of this invention.

As seen in FIG. 1 the instant invention is a plate according to the invention that can be joined together with further plates of the same type to form a plate-type heat exchanger.

The plate 1 shown in the FIG. 1 is not shown to scale in this figure but merely schematically. Here, the plate 1 according to the invention is configured as a three-layer laminate 1.

This three-layer laminate 1 includes a plastic membrane 2 forming a core layer of the laminate 1, a first nonwoven layer 3 above the plastic membrane layer 2. and a second nonwoven layer 4 below the plastic membrane layer 2.

By means of the plastic membrane layer 2, enthalpy can be transferred between two fluid streams not shown in FIG. 1, where one of the fluid streams flows above the plate 1 and the other of the two fluid streams flows below the plate 1.

In the exemplary embodiment shown the plastic membrane layer 2 is formed from a polyurethane material.

The first nonwoven layer 3 and the second nonwoven layer 4 are formed from a thermally deformable nonwoven material, in the exemplary embodiment shown from a polyester nonwoven. The polyester nonwoven has a weight of 50 $g/m^2$. Furthermore the polyester nonwoven is configured to be hygroscopically variable, wherein for this purpose the polyester nonwoven is provided with a coating that consists of a suitable zeolite and a binder.

The two nonwoven layers 3, 4 impart to the plate 1 impart a predetermined mechanical strength and a rigid three-dimensional shape. The mechanical strength and three-dimensional shape can be maintained for the entire service life of the plate in a plate-type heat exchanger.

Between the plastic membrane layer 2 on the one hand and the nonwoven layers 3, 4 on the other hand, a flat adhesive connection is provided. In the embodiment of the plate 3 shown in FIG. 1 this can be implemented by the material properties of the polyester nonwoven forming the nonwoven layers 3, 4 and/or by material properties of the plastic membrane layer 2.

Alternatively it is possible to achieve this adhesive connection by a binder, preferably by a hot melt adhesive.

In order to manufacture a plate-type heat exchanger from a plurality of such plates 1, these can be interlocked and welded at their edges. This creates separate flow passages for the one fluid stream and for the other fluid stream. Enthalpy can be exchanged between the fluid streams through the plate 1.

Figure 2:
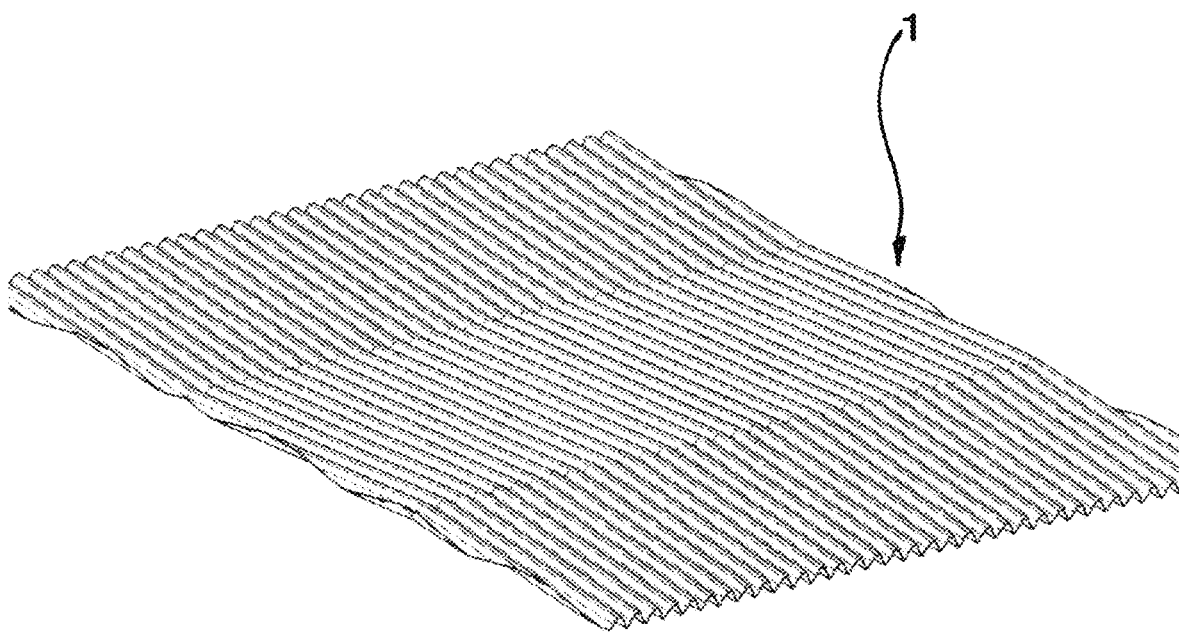
FIG. 2 shows in larger scale a sheet of the laminate of this invention.
Figure 3:
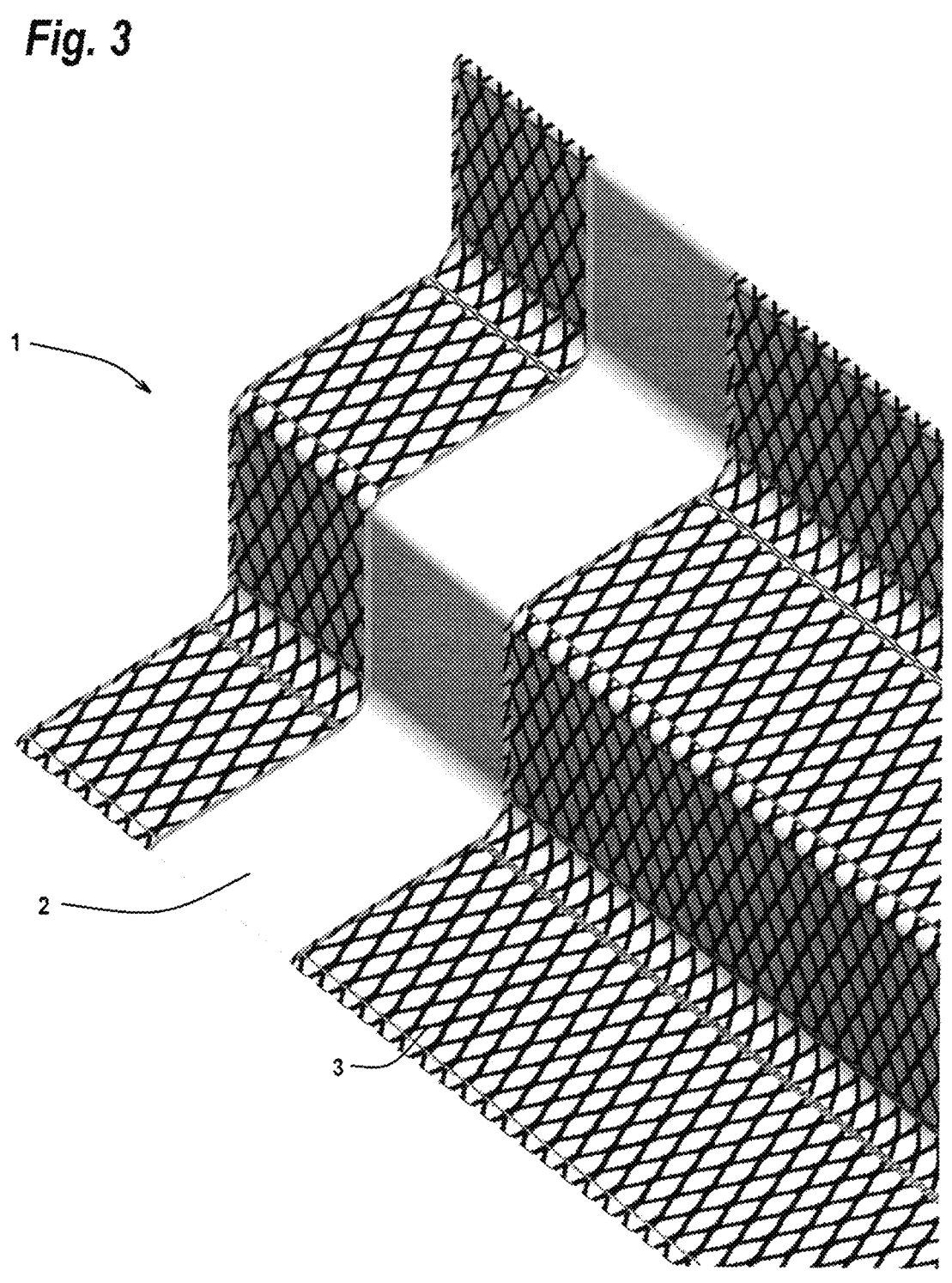
FIG. 3 is a detail view of a small part of the sheet shown in FIG. 2.

In order to produce the plate 1, a flat three-layer laminate 1 is firstly created. In this case the plastic membrane layer 2 is placed on the lower nonwoven layer 4 and the upper nonwoven layer 1 is placed on the plastic membrane layer 2. Then the plate 1 is corrugated as shown in FIGS. 2 and 3 by a single process step that is used both for deformation, i.e.

creation of a three-dimensional structure for the plate 1 and also for flat connection between the plastic membrane layer 2 on the one hand and the two nonwoven layers 3, 4 on the other hand. The same tools that are also used in the manufacture of conventional plates are also used for this process step.

Furthermore a maximum temperature that is 160° C. is not exceeded in this process step. This ensures that the plastic membrane layer 3 retains its enthalpy permeability required for its correct functioning.

For varying hygroscopy of the two nonwoven layers 3, 4 these are provided with a coating of a zeolite and a binder, and this coating can be produced by a dipping or a spraying process.

FIG. 3 shows how the cover layer 3 that serves for support can be broken through or formed as a grid or mesh. In FIG. 3 the layer 4 is underneath the layer 2 and not visible.

I claim:

1. A method of making a plate for a heat exchanger, the method comprising the steps of sequentially:
   a) providing a first rigid support layer of a flat generally planar shape and consisting of a broken-through and plastically deformable material;
   b) laminating to the first layer by a surface-connection layer a flat generally planar membrane layer capable of transferring enthalpy between two fluid streams separated by the plate and also of the flat generally planar shape; and
   c) deforming all of the laminated together layers into a laminate of a nonplanar and three-dimensional shape.

2. The plate according to claim 1, wherein the membrane layer is of plastic.

3. The method according to claim 2, wherein the plastic membrane layer is a polyurethane or a polymer.

4. The method according to claim 1, wherein the support layer is formed from a thermally deformable material.

5. The method according to claim 1, further comprising prior to step c) the step of:
   laminating a second support layer by another flat and generally nonplanar connection layer to a side of the membrane layer facing away from the first support layer.

6. The method according to claim 1, wherein the flat connection layer between the first support layer and the membrane layer is of the same material properties as the first support layer or membrane layer.

7. The method according to claim 1, further comprising the step of:
   or adhesively bonding the laminate of step c) at its edges and to form a plate-like heat exchanger.

8. The method according to claim 1, wherein the connection layer is formed by an adhesive between the support layer and the membrane layer.

9. The method according to claim 1, further comprising the step of:
   providing the first support layer with a coating made of a zeolite and a binder by a dipping or spraying process.

10. A laminate of the nonplanar three-dimensional shape made by the method of claim 1.

* * * * *